(12) United States Patent
Worth

(10) Patent No.: US 6,675,854 B2
(45) Date of Patent: Jan. 13, 2004

(54) GUIDE STRUCTURE FOR A MASTER PROCESSING APPARATUS

(75) Inventor: Cory W. Worth, Phoenix, AZ (US)

(73) Assignee: Xyron, Inc., Scottsdale, AZ (US)

( * ) Notice: Subject to any disclaimer, the term of this patent is extended or adjusted under 35 U.S.C. 154(b) by 57 days.

(21) Appl. No.: 10/140,325

(22) Filed: May 8, 2002

(65) Prior Publication Data

US 2003/0209331 A1 Nov. 13, 2003

(51) Int. Cl.$^7$ ............................................. B32B 31/00
(52) U.S. Cl. ....................................... 156/555; 156/582
(58) Field of Search ................................ 156/555, 580, 156/582, 583.1; 100/155 R, 160, 176

(56) References Cited

U.S. PATENT DOCUMENTS

| | | | |
|---|---|---|---|
| 4,387,000 A | * 6/1983 | Tancredi | ...... 156/495 |
| 4,619,728 A | * 10/1986 | Brink | ...... 156/555 |
| 5,584,962 A | 12/1996 | Bradshaw et al. | |
| 5,735,998 A | 4/1998 | Bradshaw | |
| 5,788,806 A | 8/1998 | Bradshaw et al. | |
| 5,961,779 A | 10/1999 | Bradshaw | |
| 6,244,322 B1 | 6/2001 | Paque | |
| 6,270,612 B1 | 8/2001 | Bradshaw | |
| RE37,345 E | 9/2001 | Bradshaw et al. | |
| RE37,758 E | 6/2002 | Bradshaw et al. | |
| 6,427,744 B2 | 8/2002 | Seki et al. | |
| 6,431,243 B1 | 8/2002 | Ito et al. | |
| 6,431,244 B1 | 8/2002 | Moriguchi et al. | |
| 6,523,592 B2 | 2/2003 | Kuki | |
| 6,550,516 B2 | 4/2003 | Moriguchi et al. | |
| 6,578,618 B2 | 6/2003 | Ito et al. | |
| 2001/0004922 A1 | 6/2001 | Seki et al. | |
| 2002/0053398 A1 | 5/2002 | Miller | |
| 2002/0059980 A1 | 5/2002 | Lemens et al. | |

FOREIGN PATENT DOCUMENTS

| | | |
|---|---|---|
| JP | 11-245296 | 9/1999 |
| JP | 11-245297 | 9/1999 |
| JP | 11-245299 | 9/1999 |
| JP | 11-254528 | 9/1999 |
| JP | 11-278416 | 10/1999 |
| JP | 2000-37775 | 2/2000 |
| JP | 2000-168020 | 6/2000 |
| JP | 2000-272005 | 10/2000 |
| JP | 2001-79940 | 3/2001 |
| JP | 2001-79942 | 3/2001 |
| JP | 2001-79943 | 3/2001 |
| JP | 2001-79946 | 3/2001 |
| JP | 2001-96617 | 4/2001 |
| JP | 2001-96619 | 4/2001 |
| JP | 2001-277357 | 10/2001 |
| WO | WO00/66350 | 11/2000 |
| WO | WO02/40271 | 5/2002 |

* cited by examiner

*Primary Examiner*—James Sells
(74) *Attorney, Agent, or Firm*—Pillsbury Winthrop LLP

(57) ABSTRACT

A master processing apparatus for use with a pair of removable feed rolls each carrying a supply of stock material to be unwound includes a frame including first and second frame portions movably connected for movement relative to one another between open and closed positions. The first frame portion removably mounts the feed rolls. One of a pair of cooperating pressure applying structures is mounted on the first frame portion and the other is mounted on the second frame portion. A guide structure is provided on the first frame portion. When the frame portions are in the open position, mounting the feed rolls causes the guide structure to urge the end portions of the stock materials into a position whereat the cooperating structures automatically engage the end portions therebetween in the pressure applying engagement upon movement of the frame portions to the closed position.

17 Claims, 6 Drawing Sheets

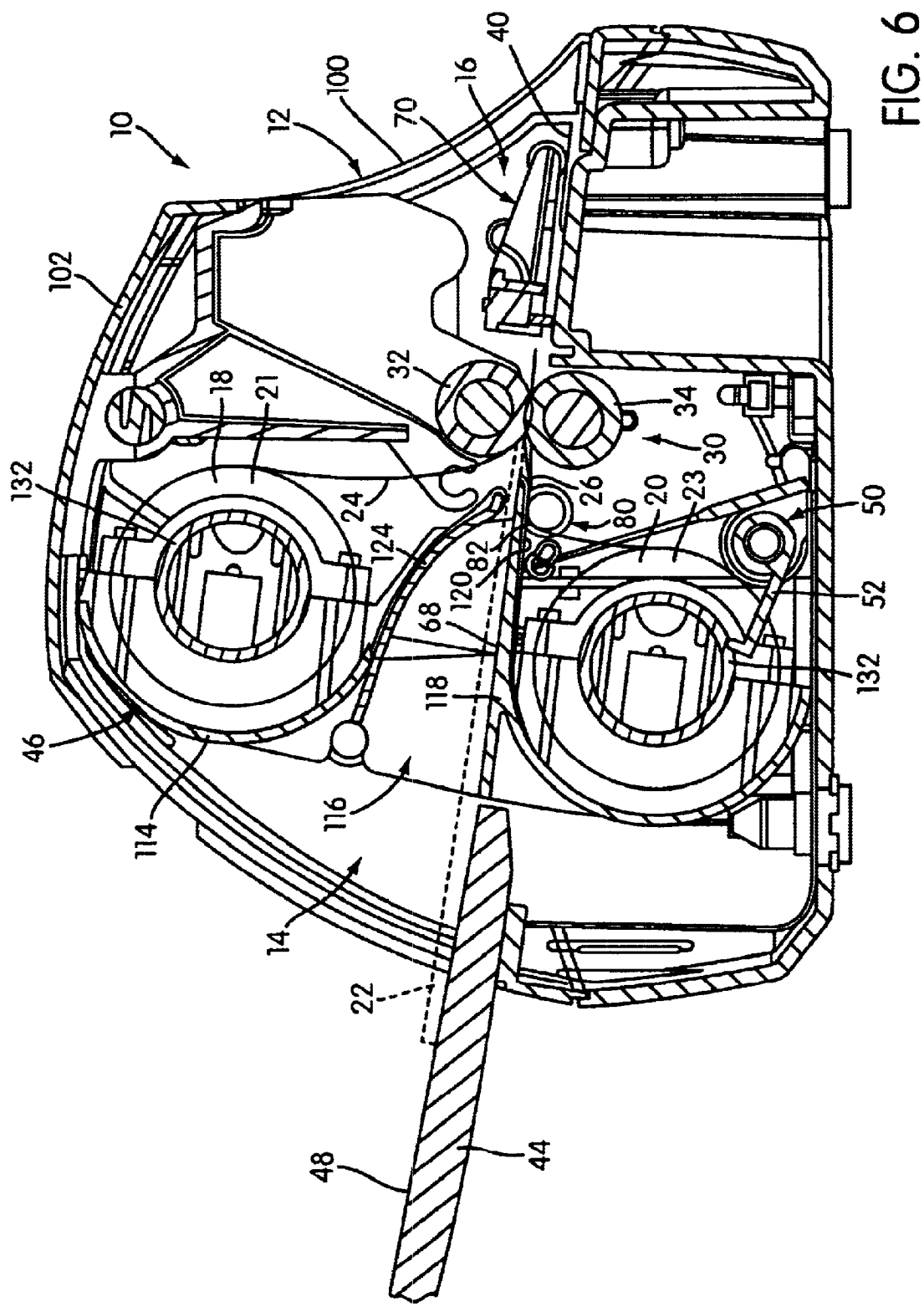

GUIDE STRUCTURE FOR A MASTER PROCESSING APPARATUS

FIELD OF THE INVENTION

The present invention relates to a master processing apparatus for performing a master processing operation on a selected substrate.

BACKGROUND OF THE INVENTION

Master processing apparatuses, such as laminating apparatuses and adhesive transfer apparatuses, are well-known in the art. These apparatuses typically include a frame to which a pair of feed rolls are removably mounted (either individually or in a cartridge). A master processing assembly is provided in the frame and the stock materials on the feed roll are unwound and fed into the processing assembly. A power or hand-operated actuator actuates the processing assembly. A master (such as a photograph, printout, business card or any other selected substrate or document) to be processed is fed into the processing assembly and the processing assembly causes adhesive from one or both the stock materials to bond to the master. In laminating operations, both stock materials are laminating films coated with pressure-sensitive or heat-sensitive adhesive and these films are both adhered to the opposing sides of the master. In adhesive transfer operations, one of the stock materials is a release liner on which a layer of adhesive is coated and the other is an aggressive or non-aggressive mask. During the operation, the adhesive on the release liner is transferred to one side of the master and, if the mask substrate is aggressive (i.e., has an affinity for adhesive bonding), then any excess adhesive will transfer to the mask substrate, which is then peeled off to expose the master on the release liner and remove the excess adhesive. For further details on these operations, reference may be made to U.S. Pat. Nos. 5,580,417 and 5,584,962.

The present invention provides improvements over known master processing apparatuses to facilitate removably mounting feed rolls to the frame such that the stock materials on the feed rolls are operatively positioned with respect to the master processing assembly.

SUMMARY OF THE INVENTION

One aspect of the invention relates to an improved structure for mounting feed rolls to the frame of a master processing apparatus. This aspect of the invention provides a master processing apparatus for use with a pair of removable feed rolls each carrying a supply of stock material to be unwound. At least one of the stock materials has a layer of adhesive provided thereon and the stock material of a first of the feed rolls is stiffer than the stock material of a second of the feed rolls with end portions of the stock materials being adhered together. The -apparatus includes a frame including a first frame portion and a second frame portion movably connected for relative movement relative to one another between open and closed positions. The first portion of the frame is constructed and arranged to removably mount the feed rolls in a predetermined orientation with the feed rolls on opposing sides of a feed path. A pair of cooperating pressure applying structures is mounted within the frame on opposing sides of the feed path. The cooperating structures are constructed and arranged to be positioned adjacent to one another in a cooperating pressure applying relationship wherein, when the master with the first and second stock materials on opposing sides thereof and the adhesive contacting the master is advanced along the feed path between the cooperating structures, the cooperating structures apply pressure to the master and stock materials as they pass therebetween so as to affect adhesive bonding between the master and the stock materials. One of the pair of cooperating pressure applying structures is mounted on the first frame portion and the other of the pair of cooperating pressure applying structures is mounted on the second frame portion such that (a) relative movement of the frame portions into the open position moves the pressure applying structures relatively apart from one another into an open access position to facilitate positioning of the stock materials therebetween and (b) relative movement of the frame portions into the closed position moves the pressure applying structures into engagement with one another and into pressure applying engagement with end portions of the stock materials positioned therebetween. A guide structure is provided on the first frame portion at a location whereat, when the feed rolls are mounted to the first frame portion in the predetermined orientation, the guide structure is positioned between the second feed roll and the cooperating structures in the direction of the feed path and on the same side of the feed path as the second feed roll. The location of the guide structure is such that, when the frame portions are in the open position with the cooperating structures in the open access position, mounting the feed rolls to the first frame portion in the predetermined orientation causes the guide structure to engage the stock material of the second feed roll so as to urge the end portions of the stock materials against the stiffness of the second feed roll's stock material toward the feed path into a position whereat the cooperating structures automatically engage the end portions therebetween in the pressure applying engagement upon movement of the frame portions to the closed position.

In another aspect of the invention, the master processing apparatus further includes a cartridge including a cartridge body structure. The feed rolls are mounted to the cartridge body structure and the cartridge body structure is removably mounted to the frame.

Yet another aspect of the invention relates to an improved method for mounting feed rolls to the frame of a master processing apparatus. This aspect of the invention provides a method for mounting a pair of feed rolls to a master processing apparatus. The feed rolls each carry a supply of stock material to be unwound, wherein at least one of the stock materials has a layer of adhesive provided thereon and wherein the stock material of a first of the feed rolls is stiffer than the stock material of a second of the feed rolls with end portions of the stock material being adhered together. The master processing apparatus includes a frame including a first frame portion and a second frame portion movably connected for movement relative to one another between open and closed positions, the frame being constructed and arranged to removably mount the feed rolls. The master processing apparatus also includes a pair of cooperating pressure applying structures mounted within the frame on opposing sides of a feed path. The cooperating structures are constructed and arranged to be positioned adjacent one another in a cooperating pressure applying relationship wherein, when the master with the first and second stock materials on opposing sides thereof and the adhesive contacting the master is advanced along the feed path between the cooperating structures, the cooperating structures apply pressure to the master and stock materials as they pass therebetween so as to affect adhesive bonding between the master and the stock materials. One of the pair of cooperating pressure applying structures is mounted on the first frame portion and the other of the pair of cooperating pressure applying structures is mounted on the second frame portion such that (1) relative movement of the frame portions into the open position moves the pressure applying structures relatively apart from one another into an open access position to facilitate positioning of the stock materials therebetween and (2) relative movement of the frame portions into the closed position moves the pressure applying structures into engagement with one another and into pressure applying engagement with end portions of the stock materials positioned therebetween. The master processing apparatus further includes a guide structure provided on the first frame portion on one side of a feed path of the apparatus. The method includes: with the frame portions in the open position and the cooperating structures in the open access position, removably mounting the feed rolls to the first frame portion in an orientation wherein the feed rolls are on opposing sides of the feed path of the apparatus and the second feed roll is on the same side of the feed path as the guide structure; as the feed rolls are mounted in the orientation, the guide structure engaging the second feed roll's stock material so as to urge the end portions of the stock materials against the supply rolls toward the feed path into a position whereat the cooperating structures will automatically engage the end portions therebetween in the pressure applying engagement upon movement of the frame portions to the closed position; and moving the frame portions to the closed position so as to automatically engage the end portions therebetween in the pressure applying engagement.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings:

FIG. 6 is a cross-sectional view of a master processing apparatus with a master being passed therethrough.

DETAILED DESCRIPTION OF THE ILLUSTRATED EMBODIMENT

Figure 1:
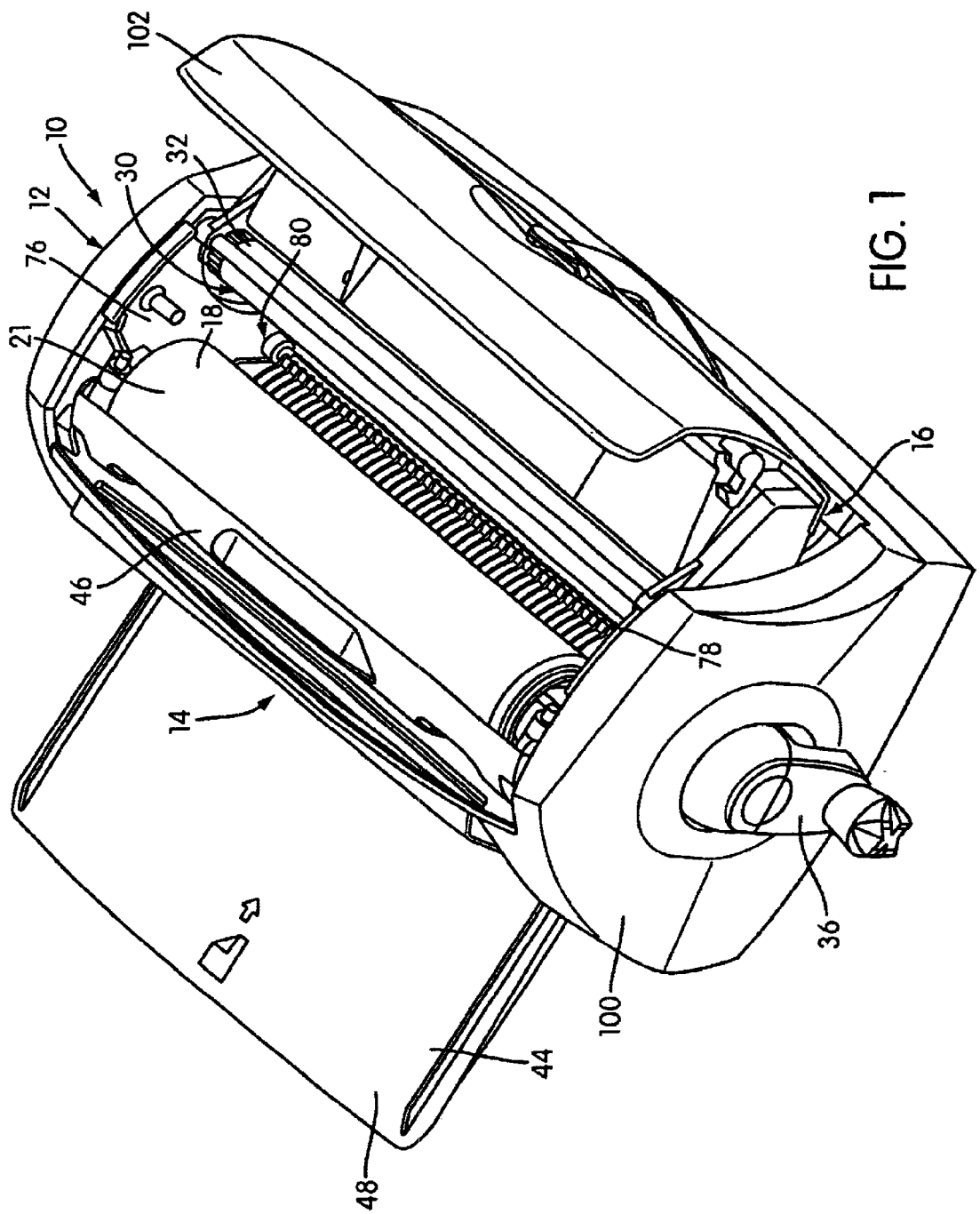
FIG. 1 is a perspective view of an embodiment of a master processing apparatus with a second frame portion thereof in an open position.

FIG. 1 shows one embodiment of a master processing apparatus 10. As explained below, the master processing apparatus 10 is constructed for use with a pair of removable feed rolls, each of which carries a supply of stock material that is wound around a central core. The stock materials can be, for example, a pair of transparent laminating films that are applied to opposing sides of a document, photograph or other master to be protected. The stock materials may be designed for adhesive transfer with one of the stock materials being a release liner coated with a pressure-sensitive adhesive and the other stock material being an adhesive mask substrate (see U.S. Pat. Nos. 5,580,417 and 5,584,962 and U.S. Appln. of Ensign, Jr., Ser. No. 09/564,587, filed May 5, 2000). Other variations of master processing operations may be performed with the apparatus 10. For example, the stock materials may include a magnetized substrate and an aggressive or non-aggressive adhesive mask (see U.S. Appln. of Neuburger, Ser. No. 09/827,943, filed Apr. 9, 2001). All the patents and patent applications mentioned hereinabove are hereby incorporated into the present application by reference. Regardless of the specific type of application, the apparatus 10 is operable to unwind the supply of stock material on each roll and apply the stock material to respective sides of the master. At least one of the stock materials has a layer of adhesive thereon which adheres the stock materials to one another and the master therebetween.

Figure 2:
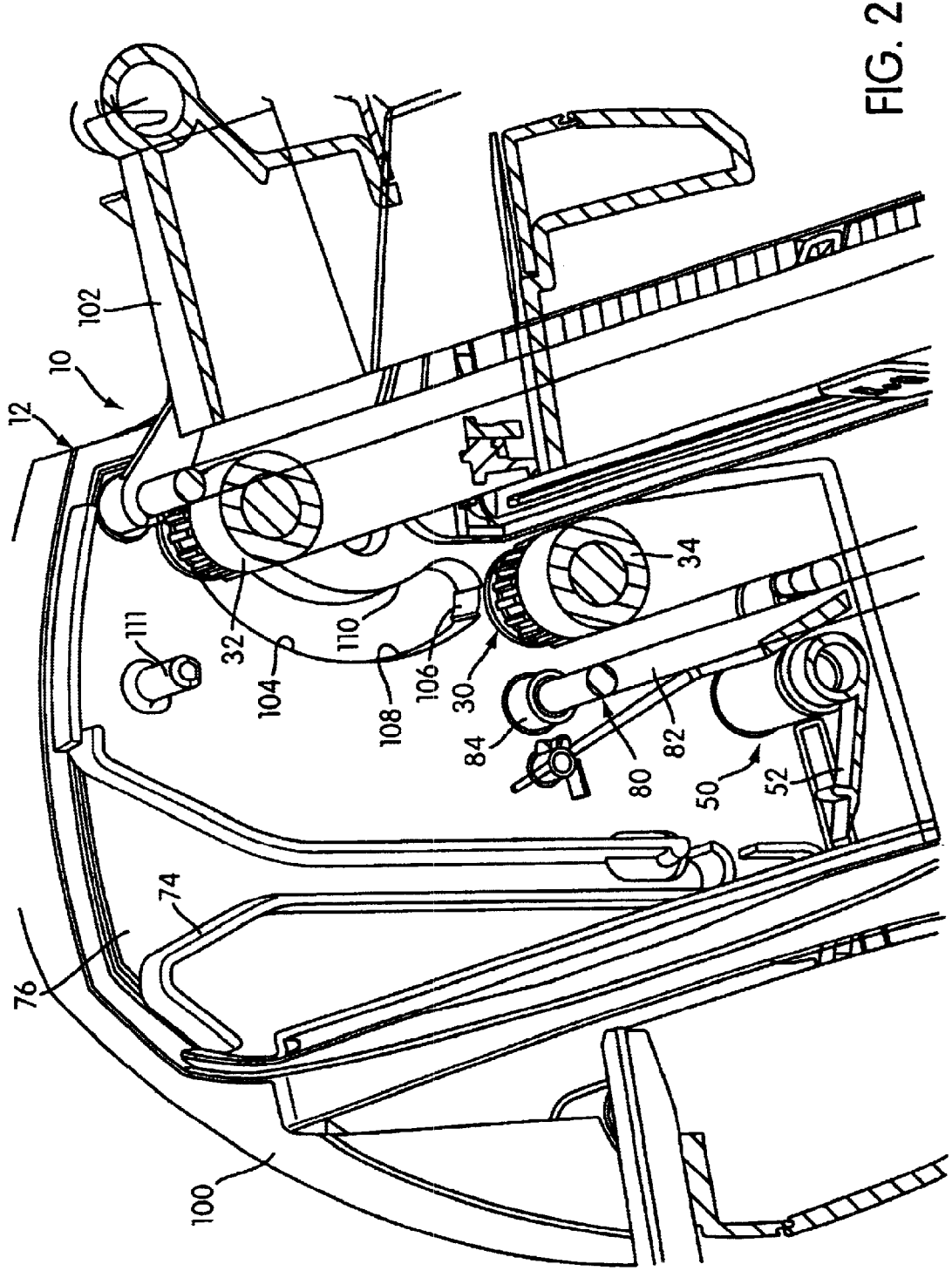
FIG. 2 is an enlarged perspective view illustrating the interior of the master processing apparatus with a feed roll cartridge removed.

The structure of the master processing apparatus 10 can be best understood from FIGS. 1, 2, and 6. The master processing apparatus 10 includes a frame 12 that has a feed opening 14 (see FIGS. 1 and 6, for example) and an exit or discharge opening 16 (see FIG. 6, for example). The internal structure of the master processing apparatus 10 can be understood from the cross section of FIG. 6. The master processing apparatus 10 is constructed and arranged to removably mount feed rolls 18, 20. In the illustrated embodiment, the feed rolls 18, 20 are mounted in the body structure of a cartridge 46 that is removably mounted in the frame 12. The frame 12 receives the cartridge 46 in a top loading manner wherein the cartridge 46 is dropped vertically downwardly into the frame 12. Each roll 18, 20 has a supply of a wound stock material or substrate 21, 23, respectively.

Generally, a master 22 (shown in dashed lines and with exaggerated thickness in FIG. 6) is inserted into the feed opening 14, and then the master 22 along with unwound end portions 24, 26 of stock material 21, 23 from the upper and lower rolls 18, 20, respectively, are passed through a master processing assembly 30. The master processing assembly 30 includes a pair of cooperating pressure applying structures in the form of first and second nip rollers 32, 34, respectively.

The nip rollers 32, 34 are rotatably mounted within the frame 12. In the illustrated embodiment, an actuator, which may be in the form of a crank handle 36 as shown in FIG. 1, is operatively connected with the nip rollers 32, 34 to affect operation thereof. Alternatively, the actuator may be power-driven by a motor. It is also contemplated that an actuator may not be provided and the master 22 is instead inserted and pulled through the master processing assembly 30 manually.

The master 22 is inserted into the master processing assembly 30 together with the stock materials 21, 23 unwound from their respective feed rolls 18, 20 and disposed on opposing sides of the master 22. At least one of the stock materials is covered with a layer of a pressure-sensitive adhesive. As the master 22 and the two layers of unwound stock material 24, 26 pass between the nip rollers 32, 34, the nip rollers perform a master processing operation. The nip rollers 32, 34 apply pressure to the stock materials (and to the master 22 when it is between the nip rollers 32, 34) during the master processing operation which causes adhesive bonding of each adhesive layer provided by the stock materials which bonds the master 22 and the stock materials 24, 26 to form a final product of the master 22 and the stock materials 24, 26. The final product is discharged out the discharge opening 16 by the driving action of the nip rollers 32, 34. The final product is supported at the discharge opening 16 by a substrate supporting surface 40. The substrate supporting surface 40 is configured to receive and support the processed master and stock materials discharged from the processing assembly in a substantially flat condition.

A feed tray 44 having a substrate supporting surface 48 is movably mounted to the frame 12 on the feed side of the master processing assembly 30. The feed tray 44 may be moved to an inoperative position (FIGS. 3–5) for storage and moved to an operative position (FIGS. 1 and 6) for master processing operations. Preferably, the tray 44 and the frame 12 are molded plastic structures, although any suitable construction can be used.

A cutting assembly 70 is disposed on the discharge side 16 of the master processing assembly 30 and is operable to sever a final product containing a master 22 from the continuous strips of stock material. The cutting assembly may be removably mounted to the frame. Specifically, the cutting assembly may be constructed and arranged to be removed from the frame for placement in a removed operative position on a generally horizontal surface separate from the frame such that, in the removed operative position, the blade is movable to perform other cutting operations including a trimming operation wherein the blade is moved to cut through the processed stock materials in a feeding direction. Further details of operation and the components of a removable cutting assembly are disclosed in U.S. patent application Ser. No. 60/304,747, the entirety of which is hereby incorporated by reference into the present specification.

A gauge assembly 50 is included to provide a continuous indication of the amount of stock material 21, 23 remaining on the feed rolls 18, 20 as the stock materials 21, 23 are being unwound. The gauge assembly 50 includes a supply roll monitor 52 that monitors an amount of stock material 21, 23 remaining on the feed rolls 18, 20 and a supply level indicator (not shown) that continuously indicates to the user the amount of stock material 21, 23 remaining on the feed rolls 18, 20 as the stock materials 21, 23 are being unwound. Further details of operation and the components of the gauge assembly 50 are disclosed in U.S. patent application Ser. No. 60/304,748, the entirety of which is hereby incorporated by reference into the present specification.

Figure 3:
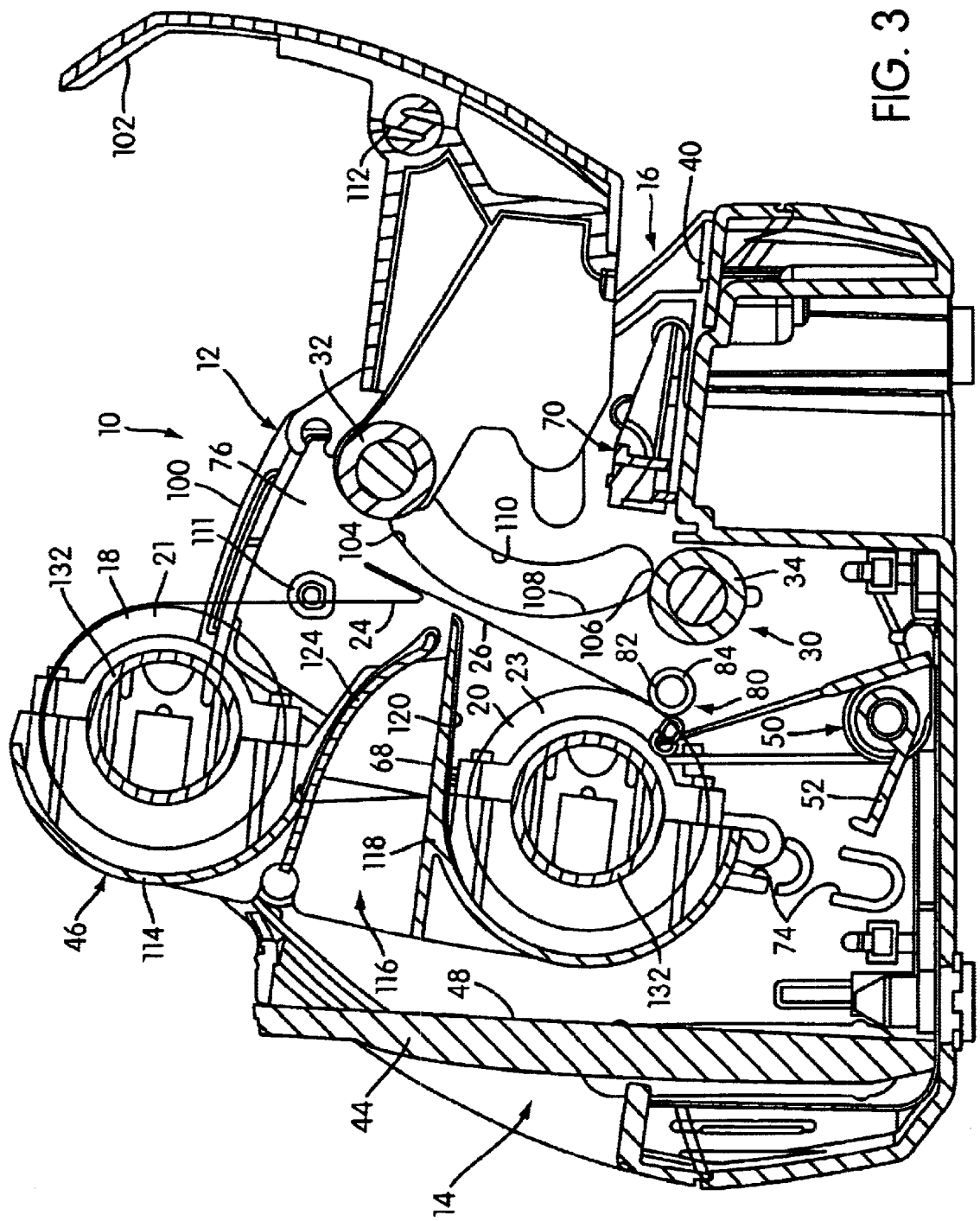
FIG. 3 is a cross-sectional view of the master processing apparatus illustrating a second frame portion thereof in an open position and a feed roll cartridge being inserted into the frame.
Figure 5:
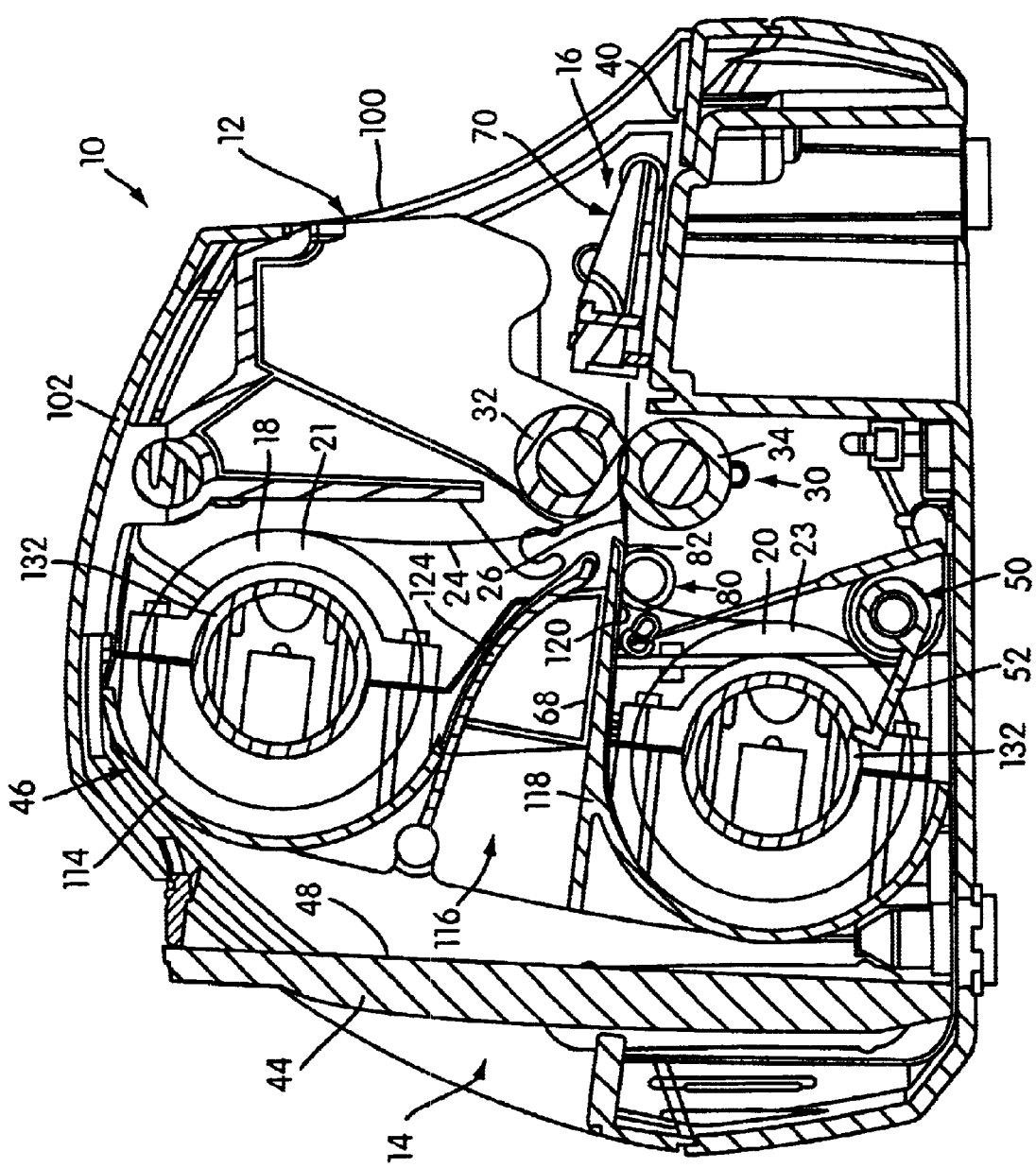
FIG. 5 is a cross-sectional view of the master processing apparatus illustrating a feed roll cartridge inserted in the frame and a second frame portion in a closed position.

In the illustrated embodiment, the frame 12 includes first and second frame portions 100, 102, which are movably connected for movement relative to one another between a closed position, as shown in FIGS. 5 and 6, and an open position, as shown in FIGS. 1, 2 and 3. The first frame portion 100 is constructed and arranged to removably mount the cartridge and feed rolls thereof in a predetermined orientation with the feed rolls on opposing sides of a feed path.

When the second frame portion 102 is in its open position, this allows an old cartridge 46 to be removed when its supply of stock materials is used up and a new cartridge having a fresh supply of stock materials to be dropped into the apparatus 10. After a new supply of stock materials is placed in the apparatus 10, the second frame portion 102 is then moved back into the closed position, which positions the end portions 24, 26 of the stock materials 21, 23 on respective feed 15 rolls 18, 20 between the nip rollers 32, 34. A guide structure 80 is positioned in spaced relation from the lower nip roller 34 to facilitate the positioning of the end portions 24, 26 of the stock materials 21, 23 between the nip rollers 32, 34, as will be further discussed.

A further understanding of the details of operation and of the components of the master processing apparatus 10 is not necessary in order to understand the principles of the present invention and thus will not be further detailed herein. Further details of operation and of the components of the master processing apparatus 10 are disclosed in U.S. patent application Ser. No. 09/987,484, the entirety of which is hereby incorporated by reference into the present specification. Instead, the present invention is concerned in detail with the guide structure 80 of the master processing apparatus 10 and how it facilitates installation of the feed rolls 18, 20 to the frame 12.

The nip rollers 32, 34 are constructed and arranged to be positioned adjacent one another in cooperating pressure applying relation to one another (FIGS. 5 and 6) and to be moved apart to an open access position (FIGS. 1–3). Specifically, one of the pressure applying structures (that is lower nip roller 34) is mounted to the first frame portion 100 and the other pressure applying structure (that is upper nip roller 32) is mounted to the second frame portion 102 such that (a) movement of the frame portions 100, 102 into their open position moves the pressure applying structures 32, 34 apart from one another into an open access position to allow the stock materials 21, 23 to be easily positioned therebetween and (b) movement of the frame portions 100, 102 into their closed position moves the pressure applying structures 32, 34 into engagement with one another and into pressure applying engagement with the end portions 24, 26 of the stock materials 21, 23 positioned therebetween.

The frame 12 includes an alignment structure constructed and arranged to guide the relative movement of the pressure applying structures 32, 34 from their open access position back into their engaged position and to hold them in uniform pressure applying relation to one another to apply uniform pressure to the stock materials 21, 23 therebetween. Specifically, an arcuate nip roller guide track 104 (only one of which is shown in the FIGS. 2 and 3) is formed in each opposing wall 76, 78 of the first frame portion 100 and a nip roller guide projection (neither of which is visible in the figures) is formed on each side of the second frame portion 102. Each of the nip roller guide projections is movably received within an associated guide track 104. Preferably, the nip roller guide projections are coaxial with the axis of rotation of the upper nip roller 32. As the second frame portion 102 is moved to its closed position, the nip roller guide tracks 104 guide the nip roller guide projections to in turn guide the upper nip roller 32 into it properly aligned position parallel and in nipped engagement with the lower nip roller 34. Each nip roller guide projection is biased into engagement with a lower wall portion and with side wall portions 106, 108, 110, respectively, of the associated guide track 104 by the latching engagement between a latch assembly 112 on the second frame portion 102 and latch structure 111 on the first frame portion 100. This latching engagement holds the frame portions 100, 102 in their closed positions and biases the roller aligning engagement between the wall portions 106, 108, 110 of the roller guide track 104 and the associated projection on each side of the second frame portion 102. This arrangement fixes the position of the upper nip roller 32 and keeps the axes of rotation of the nip rollers 32, 34 parallel.

In the illustrated embodiment, the replaceable feed rolls 18, 20 are mounted within a cartridge 46 to facilitate easy removal and replacement of the feed rolls 18, 20. The cartridge 46 includes a cartridge body structure 114, preferably made of a suitable molded plastic, constructed and arranged to be removably mounted to the apparatus frame 12 and a pair of feed rolls 18, 20 rotatably mounted therein. The feed rolls 18, 20, each carrying a supply of the stock materials 21, 23, are mounted to the cartridge body structure 114 to enable the stock materials 21, 23 to be unwound from their respective feed rolls and placed between the nip rollers 32, 34. Each roll of stock material (or substrate) 18, 20 is comprised of a long, continuous strip of stock material wound around a central tubular core 132. Typically the core 132 is made of heavy cardboard. The core 132 is rotatably mounted in the cartridge body structure 114. The cartridge body structure 114 and the feed rolls 18, 20 are constructed and arranged such that, when the cartridge body structure 114 is removably mounted to the apparatus frame 12, a master 22 can be inserted into an front opening 116 of the cartridge 46 and pass therethrough into the master processing assembly 30 of the apparatus 10 with the first and second stock materials 21, 23 from the respective feed rolls 18, 20 and disposed on opposing sides of the master 22.

The cartridge 46 includes a substrate supporting member 118, which extends between opposing sidewalls of the cartridge 46. The upper surface of the supporting member 118 provides a generally planar substrate supporting surface 68. The substrate supporting surface 68 is generally co-planar with and immediately adjacent to the substrate supporting surface 48 of the feed tray 44 so that together these surfaces 48, 68 continuously support the master from the feed tray 44 to the master processing assembly 30.

The cartridge 46 also includes a master engaging structure 124. The master engaging structure 124 applies a frictional resistance to the advancement of the master 22 in a feeding direction to thereby tension the master to prevent the same from wrinkling, for example, as it goes into the master processing assembly 30. The master engaging structure 124 may also provide the additional, but not necessary, benefit of wiping any particles off the surface of the master 22.

In a broad sense, the cartridge 46 serves to removably mount the feed roll 18, 20 to the apparatus frame 12. Thus, the cartridge 46 may be referred to as a feed roll mounting structure, which is intended to encompass any structural arrangement suitable for mounting and supporting one or more feed rolls on an apparatus frame.

When the second frame portion 102 is in its open position, this also allows an old cartridge 46 to be removed when its supply of stock materials is used up and a new cartridge having a fresh supply of stock materials to be placed into the apparatus 10.

In adhesive transfer operations, the upper and lower feed rolls 18, 20 have different stock materials 21, 23. In the illustrated embodiment, the stock material 21 provided on the upper feed roll 18 is an aggressive or non-aggressive mask and the stock material 23 provided on the lower feed roll 20 is an adhesive coated release liner. The release liner material 23 has a low modulus of elasticity in relation to the mask material 21. In other words, the release liner material 23 is stiffer than the mask material 21. As a result, the stiffer release liner material 23 on the lower feed roll 20 tends to force the less stiff mask material 21 on the upper feed roll 18 upwardly, as shown in FIG. 3. Specifically, when the upper and lower feed rolls 18, 20 are mounted to the cartridge body structure 114 of the cartridge 46, a sufficient amount of stock material 21, 23 is unwound from respective feed rolls 18, 20 to facilitate the positioning of the end portions 24, 26 of the stock materials 21, 23 between the nip rollers 32, 34. The stock materials 21, 23 are unwound such that the end portions 24, 26 are tangent to respective feed rolls 18, 20 and are adhered to one another. Because the lower feed roll 20 has a stiffer stock material than the upper feed roll 18, the end portion 26 of the lower feed roll 20 tends to remain straight and somewhat tangent to the lower feed roll 20, thus forcing the end portion 24 of the upper feed roll 18 in the same direction. Consequently, the end portions 24, 26 extend in a generally upward direction.

The guide structure 80 is provided on the first frame portion 100 at a location whereat, when the cartridge 46 and feed rolls 18, 20 thereof are mounted to the first frame portion 100 in the predetermined orientation, the guide structure 80 is positioned between the lower feed roll 20 and the nip rollers 32, 34 in the direction of the feed path and on the same side of the feed path as the lower feed roll 20. The feed path extends from the front opening 116 of the cartridge 46, through the nip rollers 32, 34, and out the discharge opening 16.

The location of the guide structure 80 is such that, when the frame portions 100, 102 are in the open position with the nip rollers 32, 34 in the open access position, mounting the cartridge 46 and feed rolls 18, 20 thereof to the first frame portion 100 into the predetermined orientation causes the guide structure 80 to engage the stock material 23 of the lower feed roll 20 so as to urge the end portions 24, 26 of the stock materials 21, 23 against the stiffness of the second feed roll's stock material 23 toward the feed path into a position whereat the nip rollers 32, 34 automatically engage the end portions 24, 26 therebetween in the pressure applying engagement upon movement of the frame portions 100, 102 to the closed position.

The guide structure 80 has a guiding surface 82 to guide the movement of the end portions 24, 26 of the stock materials 21, 23 into a position between the nip rollers 32, 34 prior to movement of the second frame portion 102 into the closed position so as to ensure the pressure applying engagement between the nip rollers 32, 34 and the end portions 24, 26 of the stock materials 21, 23.

In the illustrated embodiment, the guide structure 80 is positioned within the frame 12 in spaced relation from the lower nip roller 34. The guide structure 80 is in the form of a cylindrical guide bar. The outer peripheral surface of the guide bar 80 defines the guide surface 82. The guide bar 80 may be rigidly or rotatably mounted between opposing walls 76, 78 of the frame 12 such that it extends parallel with the nip rollers 32, 34. In the illustrated embodiment, the opposing walls 76, 78 each have an annular extension 84. Opposite ends of the guide bar 80 are received within respective annular extensions 84 to secure the guide bar 80 in position between opposing walls 76, 78.

The guide surface 82 of the guide bar 80 may include a coating to prevent the build up of adhesive thereon from the stock materials 21, 23 of the feed rolls 18, 20. The coating may be a silicon based coating or a plasma coating. However, any other suitable coating may be used that would prevent adhesive build up on the guide bar 80.

Figure 4:
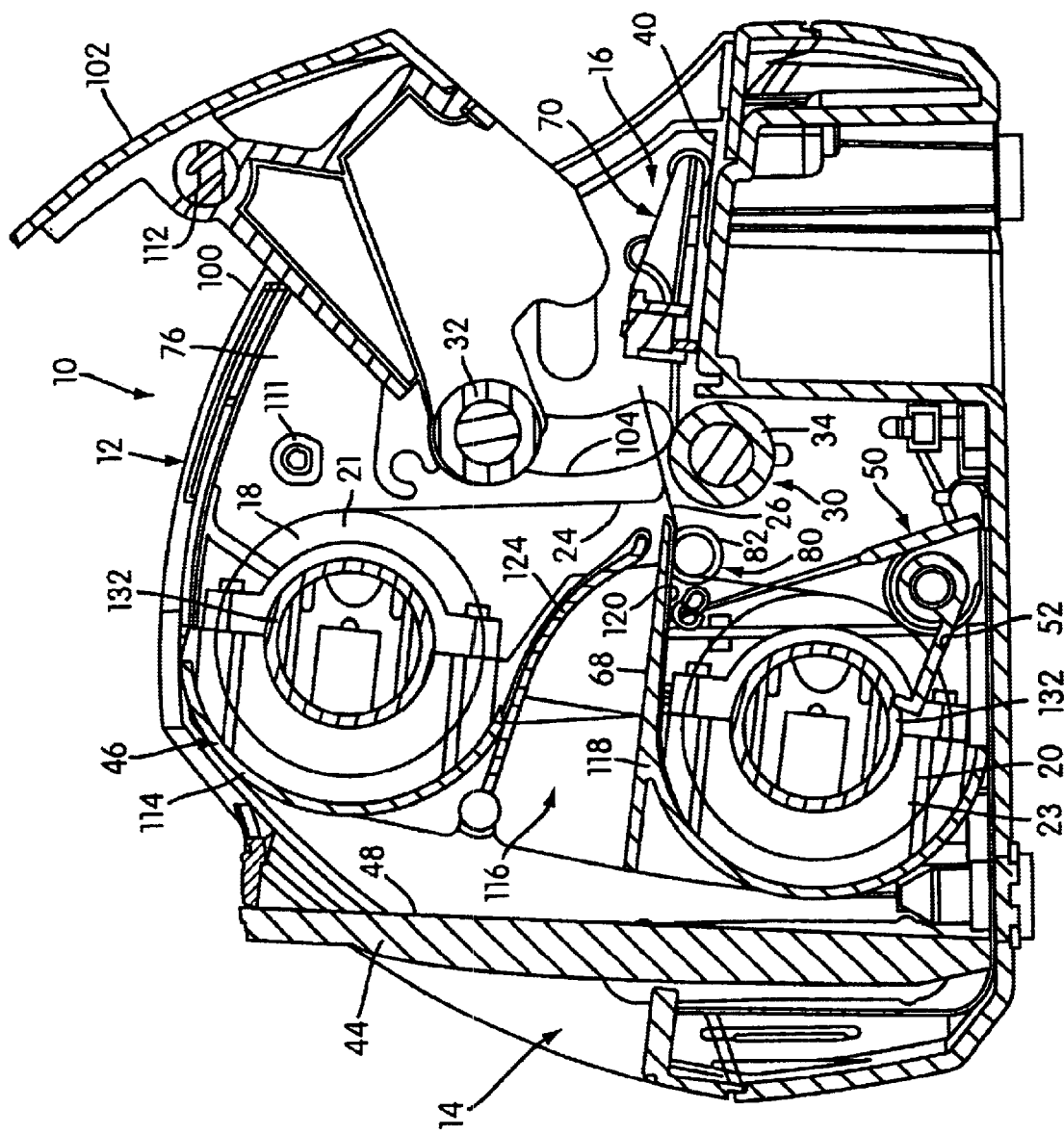
FIG. 4 is a cross-sectional view of the master processing apparatus illustrating a feed roll cartridge inserted in the frame and a second frame portion being moved to a closed position.

To install a cartridge 46 within the frame 12, the latch assembly 112 is unlatched and the second frame portion 102 is moved into its open position which moves the nip rollers 32, 34 to an open access position (FIG. 3). Guide projections (not shown) of the cartridge 46 are engaged with guide tracks 74 (FIG. 2) provided in opposing walls 76, 78 of the first frame portion 100. The cartridge 46 is moved along the guide tracks 74 into the first frame portion 100 of the frame 12. As shown in FIG. 3, the end portions 24, 26 of the stock material 21, 23 extend in a generally upward direction due the stiffer stock material 23 of the lower feed roll 20. As the cartridge 46 is further inserted into the frame 12, the guide surface 82 of the guide bar 80 engages the stock material 23 of the lower feed roll 20 so as to urge the leading end of the end portions 24, 26 of the stock materials 21, 23 to fold forward toward the feed path and toward a position between the upper and lower nip rollers 32, 34. The end portions 24, 26 continues to ride along the guide surface 82 as the cartridge 46 is further inserted into the frame 12 which causes the end portions 24, 26 to continue folding toward a position between the upper and lower nip rollers 32, 34 so that the nip rollers 32, 34 automatically engage the end portions therebetween in the pressure applying engagement upon movement of the frame portions to the closed position. When the cartridge 46 reaches an installed position as shown in FIG. 4, the end portions 24, 26 of the stock materials 21, 23 are positioned between the guide surface 82 and a guiding surface 120 of the supporting member 118 which positions the end portions 24, 26 adjacent to or into engagement with the lower nip roller 32. Thus, the guide surface 120 of the supporting member 118 cooperates with the guide surface 82 of the guide structure 80 to guide the movement of the end portions 24, 26 of the stock materials 21, 23 into a position between the nip rollers 30, 32. Further, the feed rolls 18, 20 are oriented such that they are on opposing sides of the feed path of the master processing apparatus 10 and the lower feed roll 20 is on the same side of the feed path as the guide structure 80.

The second frame portion 102 is returned to its closed position, which moves the nip rollers 32, 34 into engagement with one another and into pressure applying engagement with the end portions 24, 26 of the stock materials 21, 23 positioned therebetween. Thus, the guide bar 80 functions to cause the end portions 24, 26 of the stock materials 21, 23 to move into position between the nip rollers 32, 34, which facilitates the feed roll installation process.

Without a guide bar, when the second frame portion 102 is moved to the closed position, the upwardly extending end portions 24, 26 of the feed rolls 18, 20 would be positioned such that the upper nip roller 32 movable with the second frame portion 102 may not engage the end portions 24, 26. The operator would have to manually hold the end portions 24, 26 between the nip rollers 32, 34 until the second frame portion 102 could be moved to a substantially closed position to enable the nip rollers 32, 34 to engage the end portions 24, 26.

In some laminating operations, the upper and lower feed rolls 18, 20 have the same stock materials 21, 23 (e.g., laminating films coated with adhesive). As a result, the stock materials 21, 23 balance each other out and lay flat in a neutral plane. When a cartridge 46 is installed within the frame 12, the end portions 24, 26 of the stock materials 21, 23 are generally positioned between nip rollers 32, 34 regardless of whether a guide structure is provided. Thus, the guide structure 80 simply ensures that the end portions 24, 26 are positioned between the nip rollers 32, 34. In some instances, the laminates on the lower feed roll may be stiffer, and then the guide structures 80 would function as described above.

The guide structure 80 also functions in the context of laminating/adhesive transfer operations to straighten the end portions 24, 26 towards the feed path. In these operations, the upper feed roll 18 would have a laminate film and the lower feed roll 20 would have a stiffer release liner coated with adhesive, which can be peeled off after processing to create a document with adhesive on one side and laminate protecting on the other.

Further, the guide structure 80 functions in the context of laminating/magnet operations to straighten the end portions 24, 26 towards the feed path. In these operations, the upper feed roll 18 would have a laminate film and the lower feed roll 20 would have a stiffer magnet material to create a document with a magnet on one side and laminate protecting on the other.

Moreover, the guide structure 80 may function in operations that create a document with a magnet on one side and a removable mask material on the other. Additionally, the guide structure 80 may function in one-sided laminating operations that create a document with laminate protecting on one side and a removable mask material on the other.

To perform a master processing operation, a document or other master 22 to be covered with stock material is placed on the substrate support surface 48 of the feed tray 44 and pushed through the feed opening 14 in the frame 12 and through the cartridge front opening 116 in the replaceable cartridge 46 until the document 22 comes into contact with the unwound end portions 24, 26 of the stock materials 21, 23. At least one of the unwound end portions 24, 26 is coated with an adhesive so that the document adheres thereto. The operator then rotates the crank handle 36 which causes the nip rollers 32, 34 of the master processing assembly 30 to rotate so as to drive the master 22 and the stock materials therebetween and outwardly towards the discharge opening 16 in the frame 12. As the stock materials (with or without the master 22 therebetween) pass between the nip rollers 32, 34, the nip rollers apply pressure to the stock materials to activate the pressure sensitive adhesive and adhere the stock materials to opposing sides of the master 22 and/or to one another.

When the entire length of the master 22 has been covered with stock material 21, 23, the final product passes through the discharge opening 16. When the master has cleared the discharge opening 16, the operator stops rotation of the crank handle 36 and uses the cutting assembly 70 to sever the finished product from the continuous strip of stock materials 21, 23.

The feed rolls 18, 20 have been referred to as "upper" and "lower" feed rolls, respectively, in order to describe the illustrated embodiment. However, the feed rolls should not be limited to this arrangement as other arrangements of the feed rolls may be used.

It can thus be appreciated that the objectives of the present invention have been fully and effectively accomplished. The foregoing specific embodiments have been provided to illustrate the structural and functional principles of the present invention and are not intended to be limiting. To the contrary, the present invention is intended to encompass all modifications, alterations, and substitutions within the spirit and scope of the appended claims.

What is claimed is:

1. A master processing apparatus for use with a pair of removable feed rolls, each carrying a supply of stock material to be unwound, wherein at least one of the stock materials has a layer of adhesive provided thereon and wherein the stock material of a first of the feed rolls is stiffer than the stock material of a second of the feed rolls with end portions of the stock materials being adhered together, the apparatus comprising:

a frame including a first frame portion and a second frame portion movably connected for relative movement relative to one another between open and closed positions, the first portion of the frame being constructed and arranged to removably mount the feed rolls in a predetermined orientation with the feed rolls on opposing sides of a feed path;

a pair of cooperating pressure applying structures mounted within the frame on opposing sides of the feed path, the cooperating structures being constructed and arranged to be positioned adjacent one another in a cooperating pressure applying relationship wherein, when the master with the first and second stock materials on opposing sides thereof and the adhesive contacting the master is advanced along the feed path between the cooperating structures, the cooperating structures apply pressure to the master and stock materials as they pass therebetween so as to affect adhesive bonding between the master and the stock materials;

one of the pair of cooperating pressure applying structures being mounted on the first frame portion and the other of the pair of cooperating pressure applying structures being mounted on the second frame portion such that (a) relative movement of the frame portions into the open position moves the pressure applying structures relatively apart from one another into an open access position to facilitate positioning of the stock materials therebetween and (b) relative movement of the frame portions into the closed position moves the pressure applying structures into engagement with one another and into pressure applying engagement with end portions of the stock materials positioned therebetween; and a guide structure provided on the first frame portion at a location whereat, when the feed rolls are mounted to the first frame portion in the predetermined orientation, the guide structure is positioned between the second feed roll and the cooperating structures in the direction of the feed path and on the same side of the feed path as the second feed roll;

the location of the guide structure being such that, when the frame portions are in the open position with the cooperating structures in the open access position, mounting the feed rolls to the first frame portion in the predetermined orientation causes the guide structure to engage the stock material of the second feed roll so as to urge the end portions of the stock materials against the stiffness of the second feed roll's stock material toward the feed path into a position whereat the cooperating structures automatically engage the end portions therebetween in the pressure applying engagement upon movement of the frame portions to the closed position.

2. The master processing apparatus according to claim 1, further comprising a cartridge including a cartridge body structure, the feed rolls being mounted to the cartridge body structure and the cartridge body structure being removably mounted to the frame.

3. The master processing apparatus according to claim 2, wherein the frame receives the cartridge in a top loading manner such that the cartridge is dropped vertically downwardly into the frame.

4. The master processing apparatus according to claim 1, wherein the guide structure is a cylindrical bar that is mounted within the frame such that it extends parallel with the pair of cooperating pressure applying structures.

5. The master processing apparatus according to claim 1, wherein the cooperating structures are nip rollers.

6. The master processing apparatus according to claim 5, further comprising an actuator for imparting rotation to one or both of the nip rollers.

7. A master processing system comprising:

a pair of removable feed rolls, each carrying a supply of stock material to be unwound, wherein at least one of the stock materials has a layer of adhesive provided thereon and wherein the stock material of a first of the feed rolls is stiffer than the stock material of a second of the feed rolls with end portions of the stock materials being adhered together; and a master processing apparatus comprising:

a frame including a first frame portion and a second frame portion movably connected for relative movement relative to one another between open and closed positions, the first portion of the frame being constructed and arranged to removably mount the feed rolls in a predetermined orientation with the feed rolls on opposing sides of a feed path;

a pair of cooperating pressure applying structures mounted within the frame on opposing sides of the feed path, the cooperating structures being constructed and arranged to be positioned adjacent one another in a cooperating pressure applying relationship wherein, when the master with the first and second stock materials on opposing sides thereof and the adhesive contacting the master is advanced along the feed path between the cooperating structures, the cooperating structures apply pressure to the master and stock materials as they pass therebetween so as to affect adhesive bonding between the master and the stock materials;

one of the pair of cooperating pressure applying structures being mounted on the first frame portion and the other of the pair of cooperating pressure applying structures being mounted on the second frame portion such that (a) relative movement of the frame portions into the open position moves the pressure applying structures relatively apart from one another into an open access position to facilitate positioning of the stock materials therebetween and (b) relative movement of the frame portions into the closed position moves the pressure applying structures into engagement with one another and into pressure applying engagement with end portions of the stock materials positioned therebetween; and a guide structure provided on the first frame portion at a location whereat, when the feed rolls are mounted to the first frame portion in the predetermined orientation, the guide structure is positioned between the second feed roll and the cooperating structures in the direction of the feed path and on the same side of the feed path as the second feed roll;

the location of the guide structure being such that, when the frame portions are in the open position with the cooperating structures in the open access position, mounting the feed rolls to the first frame portion in the predetermined orientation causes the guide structure to engage the stock material of the second feed roll so as to urge the end portions of the stock materials against the stiffness of the second feed roll's stock material toward the feed path into a position whereat the cooperating structures automatically engage the end portions therebetween in the pressure applying engagement upon movement of the frame portions to the closed position.

8. The master processing system according to claim 7, further comprising a cartridge including a cartridge body structure, the feed rolls being mounted to the cartridge body structure and the cartridge body structure being removably mounted to the frame.

9. The master processing system according to claim 8, wherein the frame receives the cartridge in a top loading manner such that the cartridge is dropped vertically downwardly into the frame.

10. The master processing system according to claim 7, wherein the guiding structure is a cylindrical bar that is mounted within the frame such that it extends parallel with the pair of cooperating pressure applying structures.

11. The master processing system according to claim 7, wherein the cooperating structures are nip rollers.

12. The master processing system according to claim 11, further comprising an actuator for imparting rotation to one or both of the nip rollers.

13. The master processing system according to claim 7, wherein the adhesive is a pressure sensitive adhesive.

14. The master processing system according to claim 7, wherein both the stock materials have a layer of adhesive provided thereon.

15. A method for mounting a pair of feed rolls to a master processing apparatus, the feed rolls each carrying a supply of stock material to be unwound, wherein at least one of the stock materials has a layer of adhesive provided thereon and wherein the stock material of a first of the feed rolls is stiffer than the stock material of a second of the feed rolls with end portions of the stock material being adhered together, the master processing apparatus comprising (a) a frame including a first frame portion and a second frame portion movably connected for movement relative to one another between open and closed positions, the frame being constructed and arranged to removably mount the feed rolls, (b) a pair of cooperating pressure applying structures mounted within the frame on opposing sides of a feed path, the cooperating structures being constructed and arranged to be positioned adjacent one another in a cooperating pressure applying relationship wherein, when the master with the first and second stock materials on opposing sides thereof and the adhesive contacting the master is advanced along the feed path between the cooperating structures, the cooperating structures apply pressure to the master and stock materials as they pass therebetween so as to affect adhesive bonding between the master and the stock materials, one of the pair of cooperating pressure applying structures being mounted on the first frame portion and the other of the pair of cooperating pressure applying structures being mounted on the second frame portion such that (1) relative movement of the frame portions into the open position moves the pressure applying structures relatively apart from one another into an open access position to facilitate positioning of the stock materials therebetween and (2) relative movement of the frame portions into the closed position moves the pressure applying structures into engagement with one another and into pressure applying engagement with end portions of the stock materials positioned therebetween, and (c) a guide structure provided on the first frame portion on one side of a feed path of the apparatus, the method comprising:

with the frame portions in the open position and the cooperating structures in the open access position, removably mounting the feed rolls to the first frame portion in an orientation wherein the feed rolls are on opposing sides of the feed path of the apparatus and the second feed roll is on the same side of the feed path as the guide structure;

as the feed rolls are mounted in the orientation, the guide structure engaging the second feed roll's stock material so as to urge the end portions of the stock materials against the supply rolls toward the feed path into a position whereat the cooperating structures will automatically engage the end portions therebetween in the pressure applying engagement upon movement of the frame portions to the closed position; and moving the frame portions to the closed position so as to automatically engage the end portions therebetween in the pressure applying engagement.

16. The method according to claim 15, wherein the feed rolls are mounted in a cartridge and mounting the feed rolls comprises removably mounting the cartridge to the first frame portion.

17. The method according to claim 16, wherein the cartridge is mounted to the first frame portion in a top loading manner such that the cartridge is lowered vertically downwardly into the first frame portion.

* * * * *